(12) United States Patent
Meyer et al.

(10) Patent No.: US 9,067,546 B2
(45) Date of Patent: Jun. 30, 2015

(54) HIGH VOLTAGE PROTECTION INTERLOCK SYSTEM FOR SERVICEABILITY

(75) Inventors: Andrew Meyer, Fishers, IN (US); Ronald Erli, Middletown, IN (US); Alex Creviston, Muncie, IN (US); Colin Hamer, Noblesville, IN (US); Cary Ramey, Greenwood, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 558 days.

(21) Appl. No.: 13/530,362

(22) Filed: Jun. 22, 2012

(65) Prior Publication Data

US 2013/0342030 A1 Dec. 26, 2013

(51) Int. Cl.
  *B60R 16/03* (2006.01)
  *G05B 9/02* (2006.01)
  *F16P 3/20* (2006.01)

(52) U.S. Cl.
  CPC .. *B60R 16/03* (2013.01); *G05B 9/02* (2013.01)

(58) Field of Classification Search
  USPC ......................................................... 307/328
  See application file for complete search history.

(56) References Cited

U.S. PATENT DOCUMENTS

| | | | |
|---|---|---|---|
| 6,530,892 B1 | 3/2003 | Kelly | |
| 6,664,678 B2 | 12/2003 | Shimizu | |
| 7,227,331 B2 | 6/2007 | Galli et al. | |
| 7,909,130 B2 | 3/2011 | Morikawa et al. | |
| 2010/0127565 A1 | 5/2010 | Fukazu et al. | |
| 2010/0320853 A1 | 12/2010 | Isogai et al. | |
| 2013/0130571 A1 | 5/2013 | Hamer et al. | |
| 2013/0169083 A1* | 7/2013 | Meyer | 310/71 |
| 2013/0175853 A1 | 7/2013 | Chamberlin et al. | |

FOREIGN PATENT DOCUMENTS

| | | | |
|---|---|---|---|
| JP | 2006168600 A | 6/2006 | |
| JP | 2011238359 A | 11/2011 | |

* cited by examiner

*Primary Examiner* — Robert DeBeradinis
(74) *Attorney, Agent, or Firm* — Faegre Baker Daniels LLP

(57) ABSTRACT

An interlock system and method are provided for protecting high voltage electrical couplings. The interlock system may control access to the electrical couplings based on the voltage of the electrical couplings. The interlock system may also selectively energize and de-energize the electrical couplings based on the position of a lid.

20 Claims, 4 Drawing Sheets

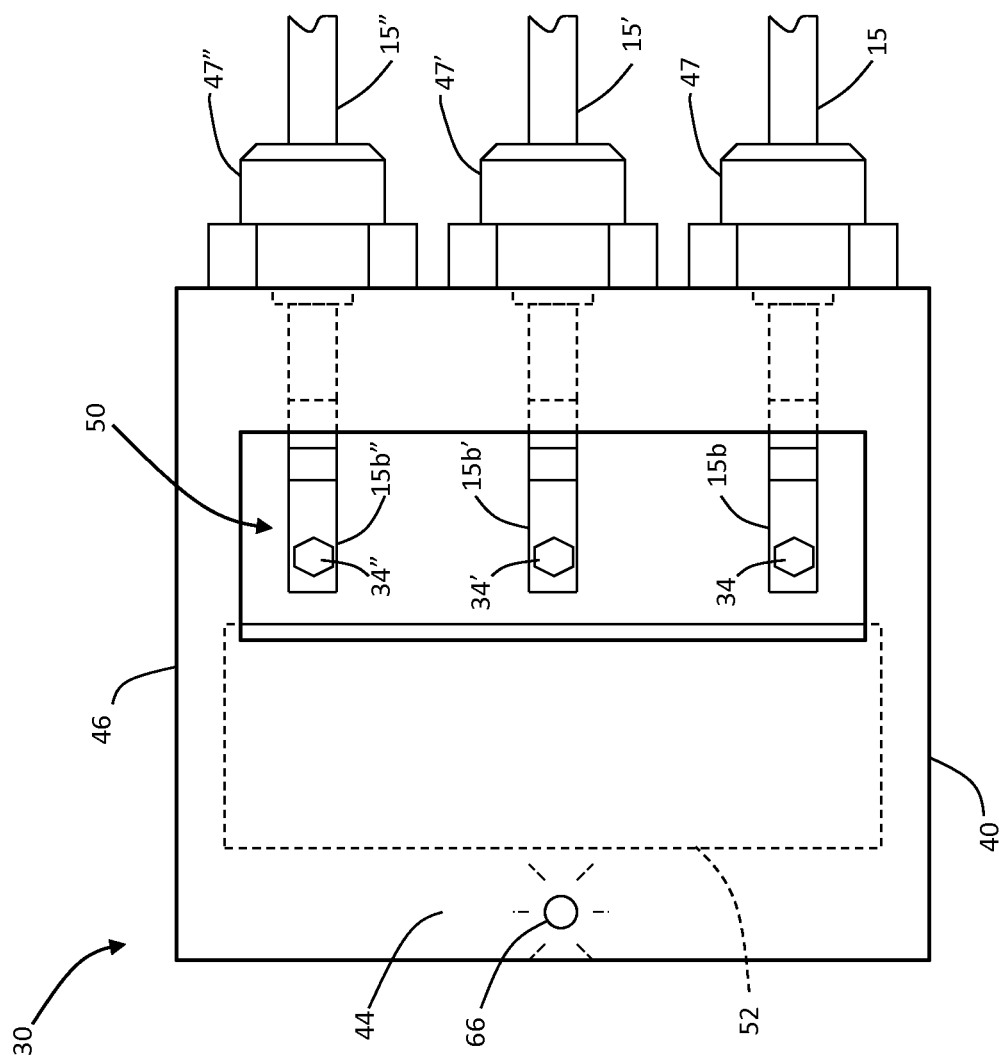

ered to be within the scope of the present invention.

HIGH VOLTAGE PROTECTION INTERLOCK SYSTEM FOR SERVICEABILITY

BACKGROUND AND SUMMARY OF THE INVENTION

The present disclosure relates generally to high voltage electrical couplings and, more particularly, to interlock systems and methods for protecting high voltage electrical couplings.

Electric machines, such as motors and generators, may be used for a variety of applications, including in connection with automobile power trains. For example, a conventional automobile may use an electric machine as a starting motor for an internal combustion engine, or as an alternator to generate electricity and deliver power to vehicle accessories and/or charge a vehicle's battery. It is also known to use electric machines as traction motors, for example with hybrid/electric vehicles.

Electric machines may be associated with a variety of high voltage couplings. For an electric motor that is coupled to a battery via an inverter, for example, high voltage couplings may exist between the inverter and the electric motor. The electric motor may include a terminal block assembly that receives high voltage wires from the inverter. An interlock cover or lid may be provided to cover the high voltage couplings in the terminal block assembly. When the lid is closed, electricity may be supplied to the couplings to undergo normal operation. When the lid is opened, such as by a service technician, the supply of electricity to the couplings may be terminated. However, even after opening the lid and terminating the supply of electricity to the couplings, the couplings may remain at an elevated voltage for some time before dropping to a safe voltage for handling and servicing by a human.

According to an illustrative embodiment of the present disclosure, a terminal block assembly is provided including a housing defining an interior region, the housing having an access opening into the interior region, a lid having a closed position that closes the access opening and an opened position that exposes the access opening, at least one terminal located within the housing, at least one high voltage wire having a lead that is configured for receipt in the housing to electrically couple the lead to the at least one terminal, and an interlock system. The interlock system includes a lock having a locked position that locks the lid in the closed position and an unlocked position that allows movement of the lid to the opened position, and a controller that commands movement of the lock between the locked position and the unlocked position.

According to another illustrative embodiment of the present disclosure, an electrical circuit is provided including a first high voltage unit, a second high voltage unit, at least one electrical coupling between the first high voltage unit and the second high voltage unit, a terminal block assembly including a housing, the terminal block assembly having a closed configuration to enclose the at least one electrical coupling in the housing and an opened configuration to provide access to the at least one electrical coupling in the housing, and means for locking the terminal block assembly in the closed configuration based on a voltage of the at least one electrical coupling.

According to yet another illustrative embodiment of the present disclosure, a method is provided for servicing a high voltage electrical coupling in a terminal block assembly, the terminal block assembly including a housing and a lid. The method includes the steps of de-energizing the electrical coupling, automatically unlocking the lid when the electrical coupling reaches a predetermined voltage that is safe for human contact, and after the unlocking step, opening the lid to access the electrical coupling in the housing.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 4 is a top plan view of the terminal block assembly of FIG. 3 also shown in the opened and unlocked configuration.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
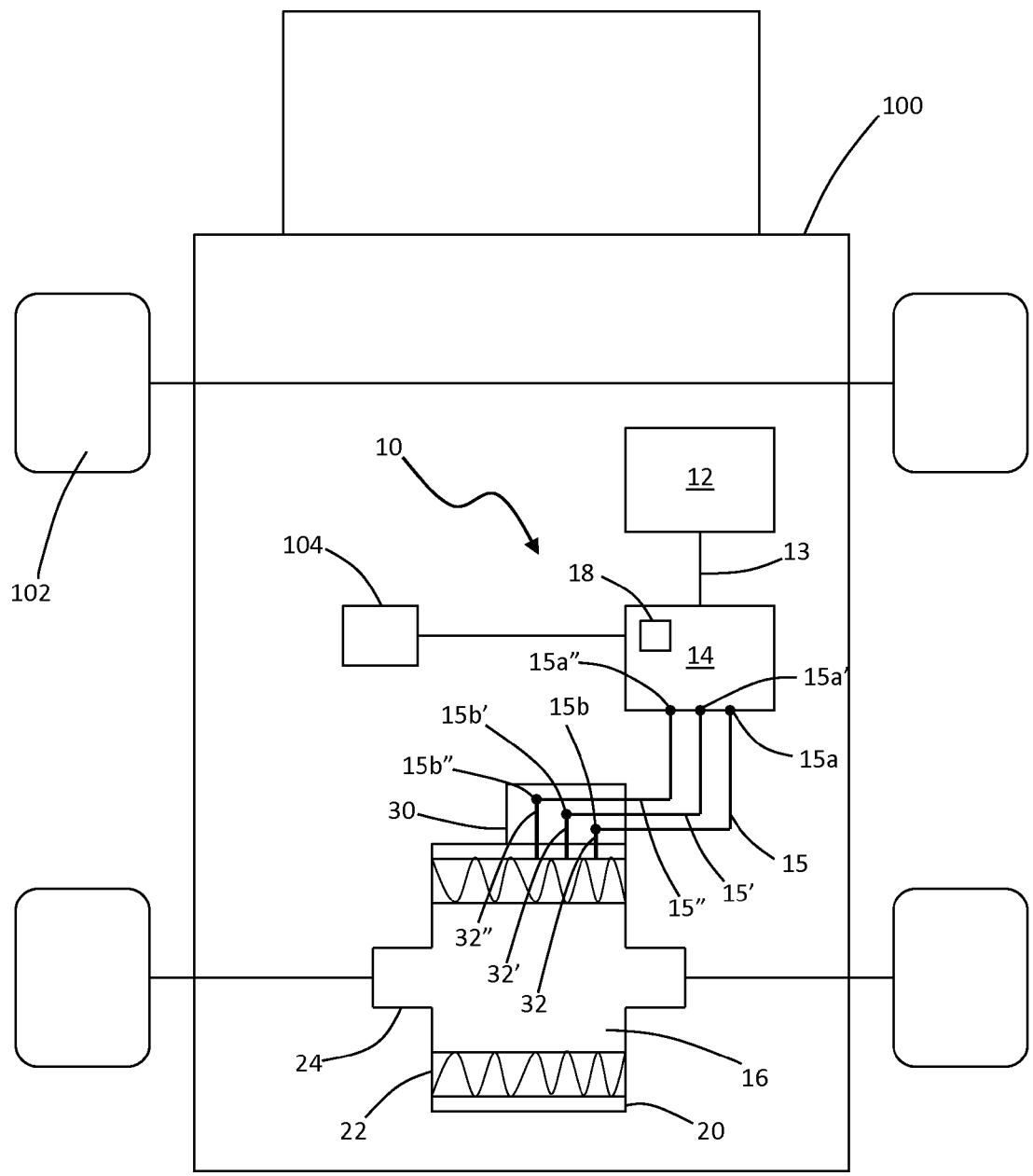
FIG. 1 is a schematic view of an electrical circuit of a vehicle, the electrical circuit including a battery, an inverter, and a motor.

Referring initially to FIG. 1, an illustrative embodiment electrical circuit 10 is provided for operating a vehicle 100. The electrical circuit 10 may be configured to power traction devices 102 (e.g., wheels) of vehicle 100 or another component 104 of vehicle 100, such as lights, a radio, or another accessory of vehicle 100, for example. The electrical circuit 10 illustratively includes a power source 12, an inverter 14, and an electric machine 16, each of which is described further below.

Power source 12 of circuit 10 is illustratively a battery. Power source 12 may deliver a direct current (DC) signal to inverter 14, such as via wire 13. It is also within the scope of the present disclosure that power source 12 may be in the form of an engine, such as an internal combustion engine.

Inverter 14 of circuit 10 may convert the DC signal from power source 12 to an alternating current (AC) signal. The AC signal may be a high voltage signal that exceeds 200 V, 250 V, or 300 V, for example. Inverter 14 may deliver the AC signal to electric machine 16 via high voltage wires 15. In the illustrated embodiment of FIG. 1, inverter 14 delivers the AC signal to electric machine 16 via three high voltage wires 15, 15', 15". Each wire 15, 15', 15" includes a first end with a corresponding lead 15a, 15a', 15a" that is selectively coupled to inverter 14 and a second end with a corresponding lead 15b, 15b', 15b" that is selectively coupled to electric machine 16, such that inverter 14 is configured to direct high voltage electricity to leads 15a, 15a', 15a", through wires 15, 15', 15", to leads 15b, 15b', 15b", and then to electric machine 16. Leads 15a, 15a', 15a", and leads 15b, 15b', 15b" may be in the form of terminal lugs or other suitable electrical connectors. Inverter 14 may also include a microprocessor 18 that is capable of sensing and controlling the voltage on wires 15, 15', 15".

Electric machine 16 of circuit 10 may be in the form of an electric motor, and more specifically a three-phase AC motor, for example. Electric machine 16 illustratively includes an outer housing 20, a stator assembly 22, and a rotor assembly 24. Exemplary electric machines 16 for use in circuit 10 include, for example, High Voltage Hairpin (HVH) motors and internal permanent magnet (IPM) motors available from Remy International, Inc. of Pendleton, Ind.

Electric machine 16 also includes a terminal block assembly 30 that houses its electrical couplings. Terminal block assembly 30 may be mounted exteriorly on housing 20 of electric machine 16 for access by a service technician. In the illustrated embodiment of FIG. 1, terminal block assembly 30 houses three machine terminals 32, 32', 32" from electric machine 16, each of which is electrically coupled to stator assembly 22. Terminal block assembly 30 is configured to receive wires 15, 15', 15", which may be selectively coupled to machine terminals 32, 32', 32" via corresponding leads 15b, 15b', 15b" located at the second ends of wires 15, 15', 15". When assembled, inverter 14 is configured to direct high voltage electricity to leads 15a, 15a', 15a", through wires 15, 15', 15", to leads 15b, 15b', 15b", to machine terminals 32, 32', 32", and to stator assembly 22 to power electric machine 16.

It is also within the scope of the present disclosure that electric machine 16 may be configured for use as a generator. In this embodiment, electric machine 16 would be configured to direct electricity to inverter 14 and to power source 12 to charge power source 12. The charged power source 12 could then distribute electricity throughout vehicle 100.

Figure 2:
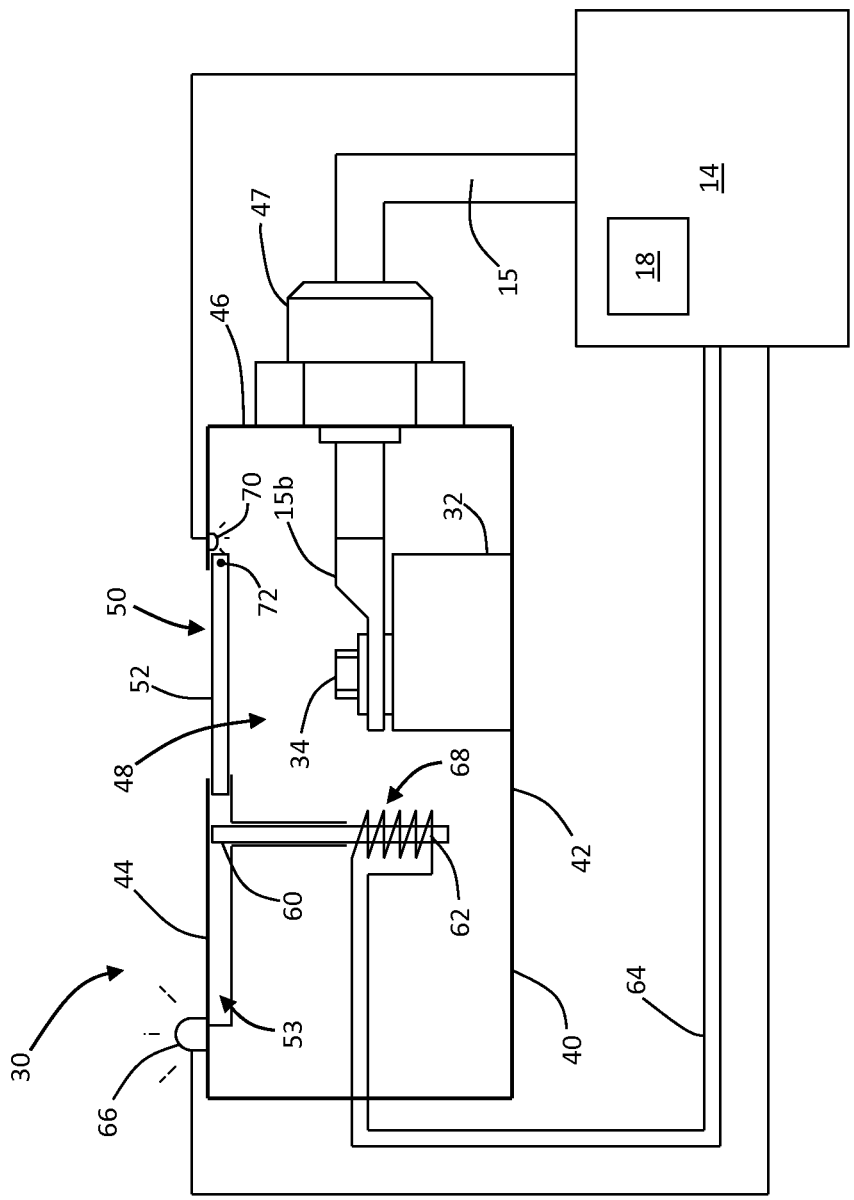
FIG. 2 is an elevational view of a terminal block assembly shown in a closed and locked configuration.
Figure 3:
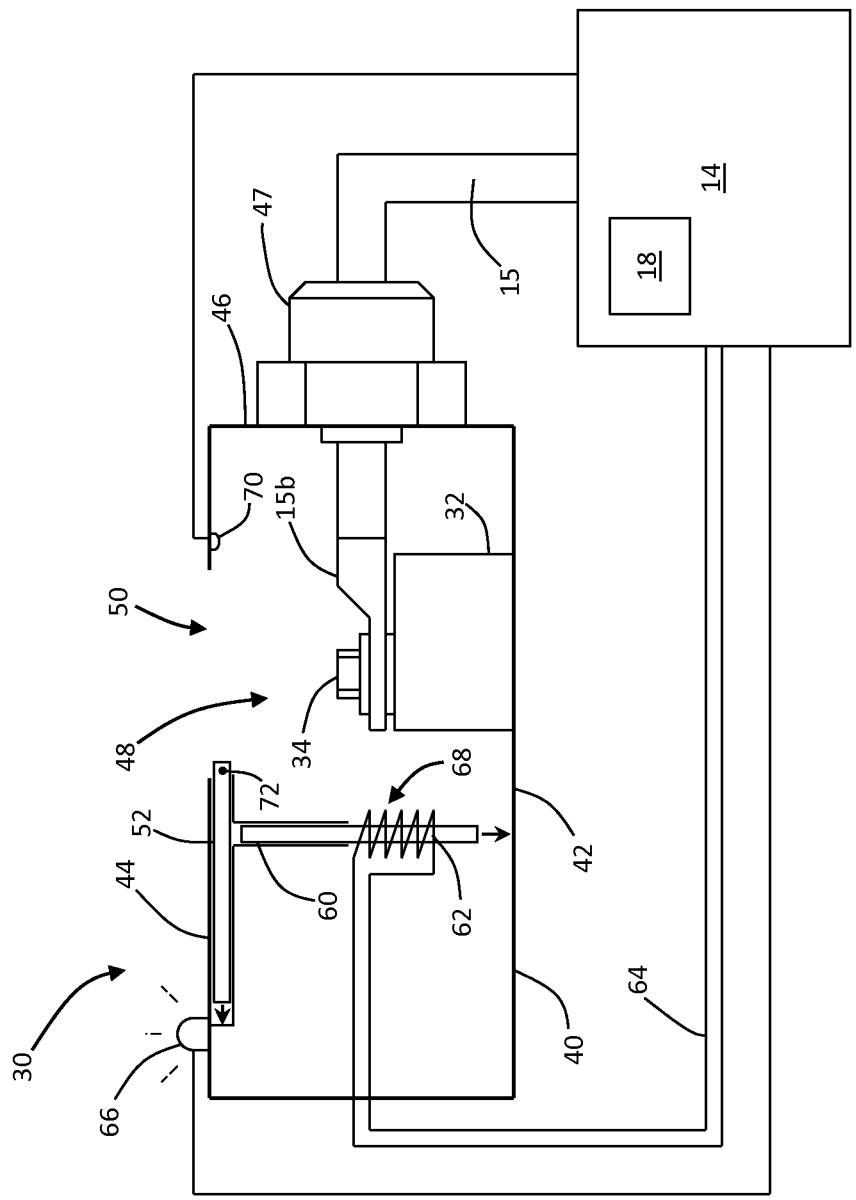
FIG. 3 is another elevational view of the terminal block assembly of FIG. 2 shown in an opened and unlocked configuration.

Terminal block assembly 30 is shown further in FIGS. 2-4. In FIGS. 2 and 3, in particular, a first electrical coupling in terminal block assembly 30 is shown between lead 15b of wire 15 and machine terminal 32 of electric machine 16. The illustrative lead 15b of wire 15 is in the form of a terminal lug, so a bolt 34 is provided to electrically couple wire 15 to machine terminal 32. The first electrical coupling between lead 15b and machine terminal 32 is shown again in FIG. 4, along with a second electrical coupling between lead 15b' and machine terminal 32' and a third electrical coupling between lead 15b" and machine terminal 32". Although the following description focuses on the first electrical coupling between lead 15b and machine terminal 32, it is understood that the following description may also apply to the second electrical coupling, the third electrical coupling, and/or other electrical couplings inside terminal block assembly 30.

As shown in FIGS. 2 and 3, terminal block assembly 30 includes housing 40 that houses, protects, shields, and/or insulates the electrical couplings contained therein. The illustrative housing 40 is substantially rectangular in shape, having bottom wall 42, top wall 44, and side walls 46 that cooperate to define interior region 48. However, the size and shape of housing 40 may vary. Bottom wall 42 of housing 40 may be sized and shaped to couple with housing 20 of electric machine 16, as shown in FIG. 1. Side wall 46 may be configured to receive wire 15. In FIGS. 2 and 3, an annular clamp 47 is mounted on side wall 46 to grip and support wire 15. Housing 40 may be an overmolded assembly that is constructed according to U.S. patent application Ser. No. 13/338,445, filed Dec. 28, 2011, and entitled OVERMOLDED INTERLOCK ASSEMBLY FOR ELECTRIC MACHINE, the disclosure of which is expressly incorporated herein by reference.

Terminal block assembly 30 may be selectively positioned in a closed configuration (FIG. 2) or an opened configuration (FIGS. 3 and 4). Top wall 44 of the illustrative housing 40 defines an access opening 50 into terminal block assembly 30. A lid 52 is provided to selectively cover the opening 50 in the closed configuration (FIG. 2) and to expose the opening 50 in the opened configuration (FIGS. 3 and 4). The illustrative lid 52 is configured to translate or slide through passageway 53 and across opening 50, but it is also within the scope of the present disclosure that lid 52 may be rotated or pivoted across opening 50, such as with a hinge. Also, the illustrative lid 52 is a separate piece that is distinct from housing 40, but it is also within the scope of the present disclosure that lid 52 may be integrally coupled to housing, such as via a living hinge.

With terminal block assembly 30 in the closed configuration (FIG. 2), lid 52 covers and protects the electrical couplings contained in interior region 48 of housing 40, such as the electrical coupling between lead 15b of wire 15, bolt 34, and machine terminal 32. In this closed configuration, terminal block assembly 30 may prevent unwanted human contact with the high voltage components contained therein.

With terminal block assembly 30 in the opened configuration (FIG. 3), the electrical couplings in interior region 48 of housing 40 become exposed via opening 50. Therefore, a service technician is able to access, connect, disconnect, service, repair, or otherwise interact with the electrical couplings via opening 50. For example, after inserting wire 15 through side wall 46 of housing 40, the service technician may tighten bolt 34 into place through opening 50 to complete the electrical connection between lead 15b of wire 15, bolt 34, and machine terminal 32.

According to an exemplary embodiment of the present disclosure, terminal block assembly 30 includes an interlock system 68 that controls access to interior region 48 of housing 40 based on the voltage of the electrical couplings contained therein. Interlock system 68 may include a lock 60 and a lock actuator 62 that cooperate to selectively lock and unlock lid 52. Interlock system 68 may be controlled by microprocessor 18 of inverter 14 or by another suitable controller, for example. Lock actuator 62 is illustratively a solenoid that converts electricity from inverter 14 via wires 64 into linear motion of lock 60. Lock 60 and lock actuator 62 may be positioned inside housing 40 to avoid being tampered with by a user and to provide protection from the surrounding environment.

When inverter 14 senses that wire 15 (and lead 15b, bolt 34, and machine terminal 32 coupled thereto) are at an elevated voltage (e.g., 12 V or more), interlock system 68 may lock lid 52 in the closed configuration to prevent access into housing 40. In the illustrated embodiment of FIG. 2, for example, interlock system 68 has locked lid 52 in the closed configuration by extending lock 60 into passageway 53 to block an opening movement of lid 52 through passageway 53. The elevated voltage may be present during normal operation of circuit 10, or even for a period of time after circuit 10 is de-energized. In certain embodiments, lock actuator 62 may bias lock 60 into passageway 53, even without a signal from microprocessor 18. In other embodiments, lock actuator 62 may respond to a "lock" signal from microprocessor 18 to position lock 60 in passageway 53.

When inverter 14 senses that wire 15 (and lead 15b, bolt 34, and machine terminal 32 coupled thereto) have dropped to a predetermined voltage that is safe for human contact (e.g., less than 2 V, 6 V, or 12 V), interlock system 68 may unlock lid 52, which allows a service technician to open lid 52 and access interior region 48 of housing 40. To do so, microprocessor 18 may send an "unlock" signal to lock actuator 62 by energizing wire 64 to pull lock 60 out of passageway 53, thereby allowing an opening movement of lid 52 through passageway 53. Because the electrical couplings inside terminal block assembly 30 may remain at an elevated voltage even after cutting off the supply of electricity thereto, the interlock system 68 of the present disclosure may not immediately open lid 52 after cutting off the supply of electricity.

Rather, the interlock system 68 may delay unlocking lid 52 for a period of time (e.g., 10 minutes, 20 minutes, 30 minutes, or more) after cutting off the supply of electricity to allow the electrical couplings to drop to the safe voltage.

Interlock system 68 may further include a status indicator 66 to inform the service technician whether lid 52 is locked or unlocked. For example, indicator 66 may be a bi-color LED that emits a red light when lid 52 is locked and a green light when lid 52 is unlocked. As another example, indicator 66 may be a LED that emits a light when lid 52 is locked and no light when lid 52 is unlocked, or vice versa.

Additionally, interlock system 68 may selectively energize and de-energize the components inside terminal block assembly 30 based on the position of lid 52. A sensor 70 may be provided to detect the position of lid 52 relative to housing 40. For example, a proximity sensor 70 (e.g., a Hall effect sensor) may be provided on housing 40 to detect the proximity of a suitable target 72 (e.g., a magnet) on lid 52, or vice versa. It is also within the scope of the present disclosure to utilize a switch or another mechanical device to detect the position of lid 52.

In operation, microprocessor 18 or another suitable controller may ensure that the flow of high voltage electricity between inverter 14 and electric machine 16 becomes or remains disabled as long as lid 52 is opened (FIG. 3). When the service technician completes his work and closes lid 52 (FIG. 2), sensor 70 may detect target 72 within a predetermined distance and communicate to microprocessor 18 that lid 52 has been closed. Microprocessor 18 may then enable inverter 14 to energize electric machine 16. The increasing voltage inside terminal block assembly 30 may cause lock 60 to reengage lid 52, as discussed above.

The above teachings may be applied to other terminal block assemblies in vehicle 100, in addition to terminal block assembly 30 of electric machine 16 (FIG. 1). For example, inverter 14 may include a terminal block assembly (not shown) that receives leads 15a, 15a', 15a" at the first ends of wires 15, 15', 15". As with the above-described terminal block assembly 30 of electric machine 16, an interlock system may be provided to control access into the terminal block assembly of inverter 14 based on the voltage of the electrical couplings contained therein. The interlock system may also selectively energize and de-energize the components inside the terminal block assembly of inverter 14 based on the position of a lid.

Although the invention has been described in detail with reference to certain preferred embodiments, variations and modifications exist within the spirit and scope of the invention as described and defined in the following claims.

The invention claimed is:

1. A terminal block assembly comprising:
a housing defining an interior region, the housing having an access opening into the interior region;
a lid having a closed position that closes the access opening and an opened position that exposes the access opening;
at least one terminal located within the housing;
at least one high voltage wire having a lead that is configured for receipt in the housing to electrically couple the lead to the at least one terminal; and
an interlock system comprising:
    a lock having a locked position that locks the lid in the closed position and an unlocked position that allows movement of the lid to the opened position; and
    a controller that commands movement of the lock between the locked position and the unlocked position.

2. The terminal block assembly of claim 1, wherein the controller commands movement of the lock based on a voltage of the at least one wire.

3. The terminal block assembly of claim 2, wherein the controller commands movement of the lock to the unlocked position when the at least one wire reaches a predetermined voltage that is safe for human contact.

4. The terminal block assembly of claim 3, wherein the controller positions the lock in the locked position when the at least one wire exceeds the predetermined voltage.

5. The terminal block assembly of claim 1, wherein the controller controls a flow of electricity to the at least one wire based on the position of the lid.

6. The terminal block assembly of claim 1, wherein the interlock system further comprises a sensor in communication with the controller, the sensor configured to detect the position of the lid.

7. The terminal block assembly of claim 1, wherein the controller senses the voltage of the at least one wire.

8. The terminal block assembly of claim 1, wherein the controller comprises an inverter.

9. The terminal block assembly of claim 1, wherein the interlock system further comprises a lock actuator in electrical communication with the controller, the lock actuator comprising a solenoid that converts an electrical signal from the controller into movement of the lock.

10. The terminal block assembly of claim 1, wherein the at least one wire electrically couples an inverter to an electric motor.

11. An electrical circuit comprising:
a first high voltage unit;
a second high voltage unit;
at least one electrical coupling between the first high voltage unit and the second high voltage unit;
a terminal block assembly including a housing, the terminal block assembly having a closed configuration to enclose the at least one electrical coupling in the housing and an opened configuration to provide access to the at least one electrical coupling in the housing; and
means for locking the terminal block assembly in the closed configuration based on a voltage of the at least one electrical coupling.

12. The electrical circuit of claim 11, further comprising means for unlocking the terminal block assembly based on the voltage of the at least one electrical coupling.

13. The electrical circuit of claim 11, further comprising means for energizing the at least one electrical coupling when the terminal block assembly transitions from the opened configuration to the closed configuration.

14. The electrical circuit of claim 11, wherein the locking means is located inside the housing.

15. The electrical circuit of claim 11, wherein the first unit comprises an inverter and the second unit comprises an electric motor.

16. The electrical circuit of claim 15, wherein the second unit drives a traction device of a vehicle.

17. A method of servicing a high voltage electrical coupling in a terminal block assembly, the terminal block assembly including a housing and a lid, the method comprising the steps of:
de-energizing the electrical coupling;
automatically unlocking the lid when the electrical coupling reaches a predetermined voltage that is safe for human contact; and
after the unlocking step, opening the lid to access the electrical coupling in the housing.

18. The method of claim 17, wherein the de-energizing step and the unlocking step are separated by about 10 minutes or more.

19. The method of claim 17, further comprising the steps of:
  closing the lid; and
  re-energizing the electrical coupling after the closing step.

20. The method of claim 17, further comprising the step of automatically locking the lid when the electrical coupling exceeds the predetermined voltage.

* * * * *